(12) United States Patent
Zhao et al.

(10) Patent No.: US 9,201,967 B1
(45) Date of Patent: Dec. 1, 2015

(54) RULE BASED PRODUCT CLASSIFICATION

(75) Inventors: Shaojun Zhao, Bellevue, WA (US); Cyrus Khoshnevisan, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 642 days.

(21) Appl. No.: 13/468,400

(22) Filed: May 10, 2012

(51) Int. Cl.
G06F 17/30 (2006.01)

(52) U.S. Cl.
CPC .............................. *G06F 17/30867* (2013.01)

(58) Field of Classification Search
CPC .......... G06F 17/30864; G06F 17/3064; G06F 17/30598; G06F 17/241; G06F 17/30386; G06F 17/30398; G06F 17/3053; G06F 17/30675
USPC ....................................................... 707/710
See application file for complete search history.

(56) References Cited

U.S. PATENT DOCUMENTS

| | | | |
|---|---|---|---|
| 7,624,093 | B2 * | 11/2009 | Fortuna, Jr. |
| 8,180,688 | B1 * | 5/2012 | Velummylum et al. ..... 705/26.7 |
| 2007/0299743 | A1 * | 12/2007 | Staib et al. ...................... 705/27 |
| 2008/0243784 | A1 * | 10/2008 | Stading ............. G06F 17/30657 |
| 2008/0243785 | A1 * | 10/2008 | Stading ............. G06F 17/30867 |
| 2008/0243786 | A1 * | 10/2008 | Stading ............. G06F 17/30011 |
| 2008/0243787 | A1 * | 10/2008 | Stading ............. G06F 17/30864 |
| 2009/0125378 | A1 * | 5/2009 | Trahan et al. ..................... 705/10 |
| 2010/0017400 | A1 * | 1/2010 | Engel ................ G06F 17/30011 707/E17.008 |
| 2010/0205167 | A1 * | 8/2010 | Tunstall-Pedoe et al. .... 707/706 |
| 2011/0238670 | A1 * | 9/2011 | Mercuri ......................... 707/748 |
| 2011/0282821 | A1 * | 11/2011 | Levy et al. ...................... 706/47 |
| 2011/0295658 | A1 * | 12/2011 | Bastos et al. ................. 705/14.1 |
| 2011/0313933 | A1 * | 12/2011 | Dai et al. ....................... 705/301 |
| 2012/0084120 | A1 * | 4/2012 | Hirsch et al. ................. 705/7.32 |
| 2012/0095978 | A1 * | 4/2012 | Levin et al. ................... 707/706 |
| 2012/0173320 | A1 * | 7/2012 | Kail et al. .................... 705/14.4 |
| 2013/0066961 | A1 * | 3/2013 | Naik et al. ..................... 709/204 |
| 2013/0091138 | A1 * | 4/2013 | Liensberger et al. ......... 707/740 |

* cited by examiner

*Primary Examiner* — Sheree Brown
(74) *Attorney, Agent, or Firm* — Thomas Horstemeyer, LLP (57) ABSTRACT

Disclosed are various embodiments for item categorizer. The item categorizer is configured to parse, in at least one computing device, at least a plurality of product descriptions of a like item category for identifying a plurality of keywords with regard to the like item category. Furthermore, the item categorizer selects a plurality of subsets of keywords from the plurality of keywords, each subset of keywords comprises a unique combination of the plurality of keywords with respect to each other. Moreover, the item categorizer is configured to generate a respective rule for each corresponding subset of keywords, wherein an application of each respective rule specifies a respective binary result depending upon whether the corresponding subset of keywords is included in a seller product description.

23 Claims, 8 Drawing Sheets

RULE BASED PRODUCT CLASSIFICATION

BACKGROUND

An electronic commerce system facilitates multitudes of online transactions between e-commerce retailors and buyers. In managing the number of items available for purchase over the electronic marketplace, catalogs of items are maintained. Each item within a global catalog may be categorized into one or more categories.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure are directed to categorizing items within a catalog used by an electronic commerce system. With a vast number of items available for purchase, there exists a relatively large number of categories that may describe a particular item. When selecting a category for an item, it may be the case that tens of thousands of predefined categories are available. When a new item is introduced into the catalog, a specific category must be designated for the new item. The seller who introduced the new item may submit the item along with a corresponding category by selecting the most appropriate category from a pre-defined list of categories. However, in this process, the seller may make an erroneous category selection. For example, the seller may choose an incorrect category. Alternatively, the seller may choose a broad category rather than a more specific category.

To reduce the occurrence of erroneous categorizations, various embodiments of the present disclosure provide ways to quickly and accurately categorize new items as well as correct any mis-categorizations that might exist within a global catalog. For example, for a particular category, the textual data contained within a preexisting global catalog may be parsed to identify top keywords associated with the particular category. Moreover, a set of rules may be generated based on the top keywords. These rules may be simple search strings based on the top keywords. The rules may be applied to prospective items in order to determine whether the prospective item falls within the particular category. By generating a set of rules for each category, all the sets of rules can be used to classify a new product. While the following discussion is directed towards classifying items by analyzing the text of product descriptions, the various embodiments of the present disclosure are not limited to items for sale over an electronic commerce system. The following approach may be applied to classifying any unstructured text such as, documents, text files, network pages, or any other unstructured text. In the following discussion, a general description of the system and its components is provided, followed by a discussion of the operation of the same.

Figure 1:
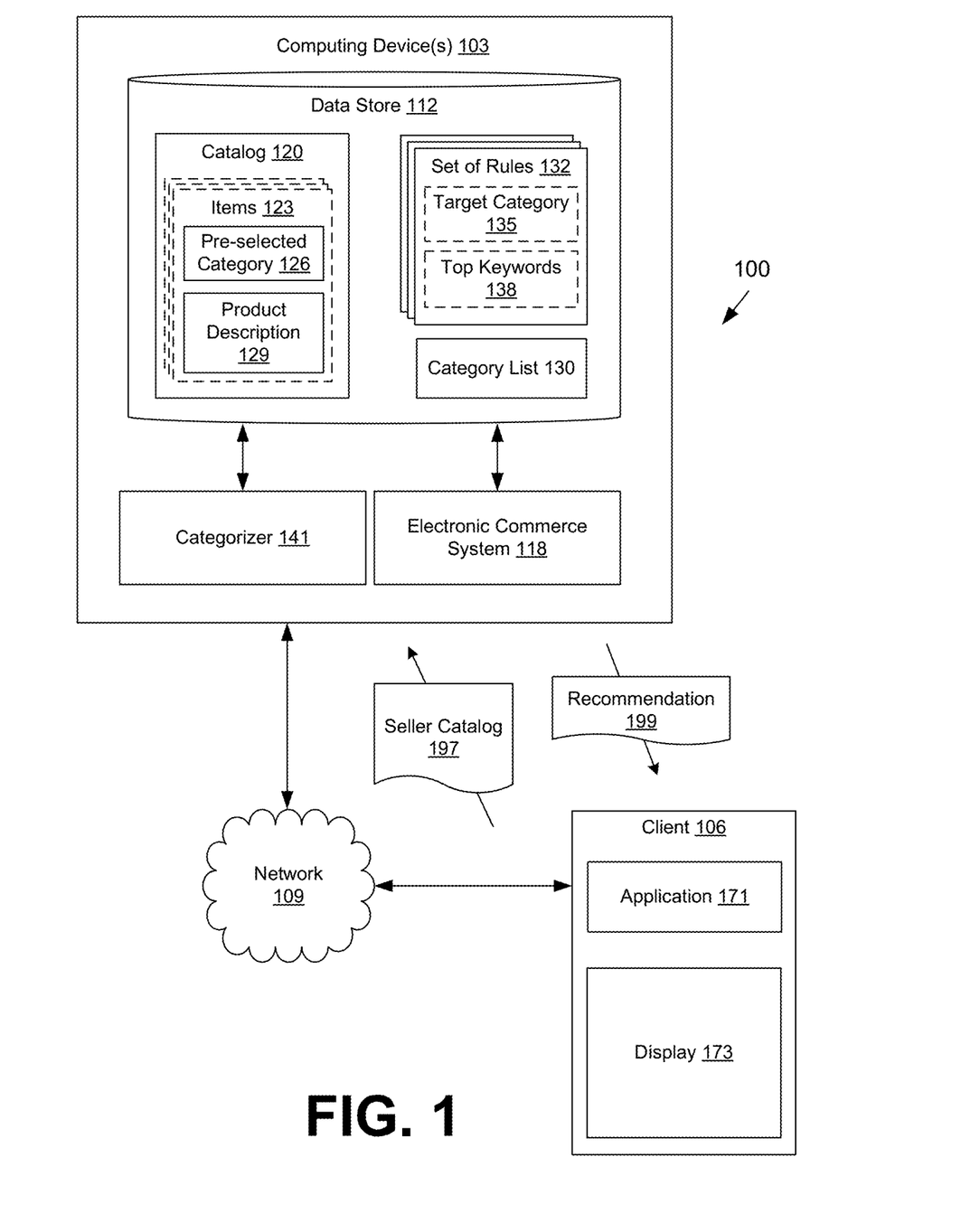
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below. The components executed on the computing device 103, for example, include a categorizer 141, an electronic commerce system 118 and other applications, services, processes, systems, engines, or functionality not discussed in detail herein. The categorizer 141 is executed to access data in the data store 112, generate sets of rules for item categories, and categorize items based on the sets of rules.

The electronic commerce system 118 is executed in order to facilitate the online purchase of items over the network 109. The electronic commerce system 118 also performs various backend functions associated with the online presence of a merchant in order to facilitate the online purchase of items. For example, the electronic commerce system 118 generates network pages such as web pages or other types of network content that are provided to clients 106 for the purposes of selecting items for purchase, rental, download, lease, or other form of consumption as will be described. The electronic commerce system 118 may employ the functionality of an inventory management system for allowing sellers to manage and track their inventory.

The data stored in the data store 112 includes, for example, a catalog 120, one or more sets of rules 132, and potentially other data. The catalog 120 may be a global catalog that includes a listing of items 123 offered as part of the electronic commerce system 118. The catalog 120 may comprise a plurality of items 123 offered by a multitude of sellers. For each item 123, there may be a corresponding pre-selected category 126. Also the item 123 may be expressed as a product description 129. The pre-selected category 126 is a category that has been designated for a particular item 123. In various embodiments, the pre-selected category 126 may be a category that is selected from a category list 130. The category list 130 is a master list of all categories that are available for classifying items 123.

The product description 129 may comprise textual information that describes a particular item 123. In various embodiments, the product description 129 may be unstructured text that expresses an item 123. In this respect, the unstructured text may be generated using data submitted through a free text box.

The one or more sets of rules 132 that is stored within the data store 112 may be used for categorizing newly added items or for re-categorizing the items 123 that exist within the catalog 120. In various embodiments, for a particular category in the category list 130, a corresponding set of rules 132 may be used for determining whether an item falls within that particular category. In this respect, for each set of rules 132, there is a target category 135 relating to the set of rules 132. Additionally, there is a list of top keywords 138 that has been defined for the target category 135. The set of rules 132 is defined based on the top keywords 138.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 106 may include a display 173. The display 173 may comprise, for example, one or more devices such as cathode ray tubes (CRTs), liquid crystal display (LCD) screens, gas plasma-based flat panel displays, LCD projectors, or other types of display devices, etc. A rendered user interface may be presented in the display 173.

The client 106 may be configured to execute various applications 171 such as browser applications, dedicated client applications, email applications, instant message applications, and/or other applications. The application 171 may be executed in a client 106, for example, to access and render network pages, such as web pages, or other network content served up by the computing device 103 and/or other servers.

A seller using the client 106 may submit a seller catalog 197 to the computing device 103 over a network 109. The seller catalog 197 may comprise a prospective seller product description that expresses an item offered for sale by the seller. This seller item is subject to categorization by the categorizer 141. In response to this submission, the categorizer 141 may employ one or more sets of rules 132 to generate a recommendation 199 for one or more categories.

Next, a general description of the operation of the various components of the networked environment 100 is provided. To begin, a categorizer 141 is executed within the computing device 103 for identifying a plurality of top keywords 138 for a target category 135. The categorizer 141 is configured to generate a set of rules 132 for each category listed in the category list 130. The categorizer 141 selects a category from the category list 130 and designates the category as a target category. The categorizer 141 generates a plurality of top keywords 138 by parsing the product descriptions 129 included within a catalog 120. Once the top keywords 138 are identified for a target category 135, a set of rules 132 are defined for the target category 135.

In various embodiments, each rule within the set of rules 132 is a unique combination of a respective subset of the plurality of top keywords 138. Moreover, each rule, in effect, is a search string made up of a subset of the top keywords 138. An application of an individual rule specifies a binary result depending upon whether the subset of the top keywords 138 is included in an unstructured text input. If all the terms of the subset are present in an unstructured text input, then a positive result is produced. Conversely, if all the search terms are not present in an unstructured text input, then a negative result is produced. By applying the entire set of rules 132 to the unstructured text input, a number of positive results is determined. If that number of positive results indicates a percentage that exceeds a threshold amount, then the application of the set of rules 132 indicates that the unstructured text input expresses an item that falls within the target category 135.

Assuming that a set of rules 132 has been generated for each category within the category list 130, an application of the plurality of the sets of rules 132 can determine a category for an item expressed in an unstructured text input. To this end, sets of rules 132 can be generated based on a pre-existing knowledge base of items that have known categories. These sets of rules 132 can be applied to prospective seller catalogs 197 for categorizing the items included within these prospective seller catalogs 197. This reduces the risk of potential errors that arise when manually designating categories. Thus, rather than prompting a seller to select the most appropriate category from the category list 130, sets of rules 132 may be determined and then employed by a categorizer 141 for making recommendations 199 of categories that accurately and specifically classify a seller item. Furthermore, the sets of rules 132 may be applied to a pre-existing catalog 120 to check the accuracy of the catalog.

In various embodiments, before a set of rules 132 is applied to a prospective seller catalog 197, each rule in the set of rules 132 is subject to validation. In this respect, a defect rate is calculated for each rule. Rules with high defect rates are rejected. This ensures that a final set of rules 132 includes highly accurate rules. Rules are validated by applying the rules to product descriptions 129 with known pre-selected categories 126 for determining a defect rate, as will be described.

Figure 2:
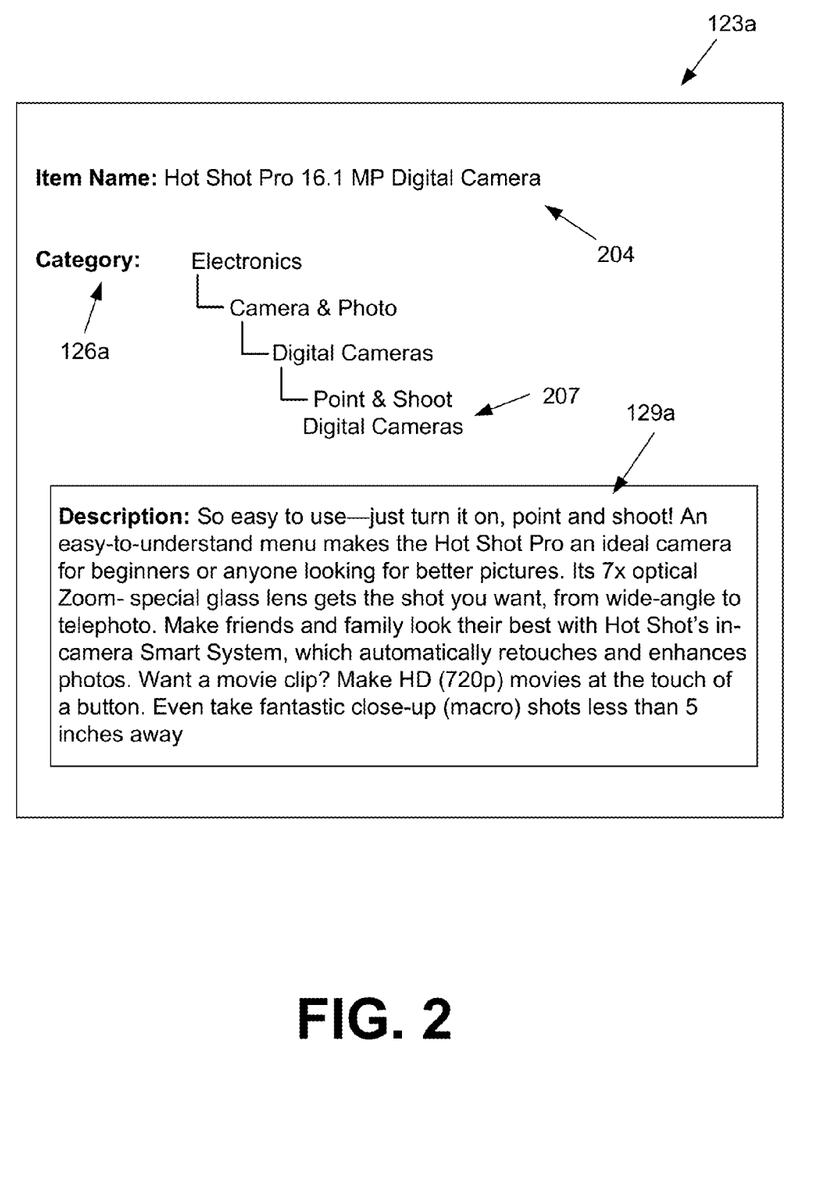
FIGS. 2-4 are drawings of examples of data stored in a data store within the networked environment of FIG. 1 according to various embodiments of the present disclosure.

Referring next to FIG. 2, shown is an example of data stored in a data store 112 (FIG. 1) within the networked environment 100 of FIG. 1 according to various embodiments of the present disclosure. Specifically, FIG. 2 represents an exemplary item 123a stored as part of the catalog 120 (FIG. 1).

In this example, the item 123a has an item title 204 of "Hot Shot Pro 16.1 MP Digital Camera." Furthermore, the item 123a may have been previously designated with a pre-selected category 126a. In this respect, an entity may have manually chosen a specific category from a category list 130 (FIG. 1). The entity may be a seller or product developer who is responsible for assigning classifications to items in a catalog. Accordingly, the catalog 120 may reflect a significant amount of manual input for classifying each item into general and specific categories.

In various embodiments, the pre-selected category 126a may fall within a categorical hierarchy. In this embodiment, the pre-selected category 126a was selected from catalog list 130 that has been organized in various categorical tiers. For example, an upper tier may describe a general category such as "electronics." The electronic category may include a variety of different branches that describe more specific categories of a middle tier such as "camera & photo," "laptops," "cellular phones," etc. For each specific category of a middle tier, there may be even more specific categories. For example, the "camera & photo" category may be comprised of categories for "digital cameras" and "film cameras." Moving down the branches leads to the most specific category 207. In this example, the "hot shot pro" item 123a falls within a series of categories, each category progressing in specificity to ultimately reach the most specific category 207 of "point & shoot digital cameras." Thus, in this embodiment, the pre-selected category 126a for the "hot shot pro" item 123a is the most specific category 207.

Additionally, a product description 129a may be associated with the item 126a. In various embodiments, the product description is an unstructured textual description that expresses an item. The product description may be authored by the seller, manufacture, or any other entity.

As seen in FIG. 2, an item in a catalog is associated with a pre-selected category 126a and an unstructured textual product description 129a. A categorizer 141 (FIG. 1) can use this information to generate rules for classifying newly submitted items as well as correcting potential errors in the catalog 120.

Figure 3:
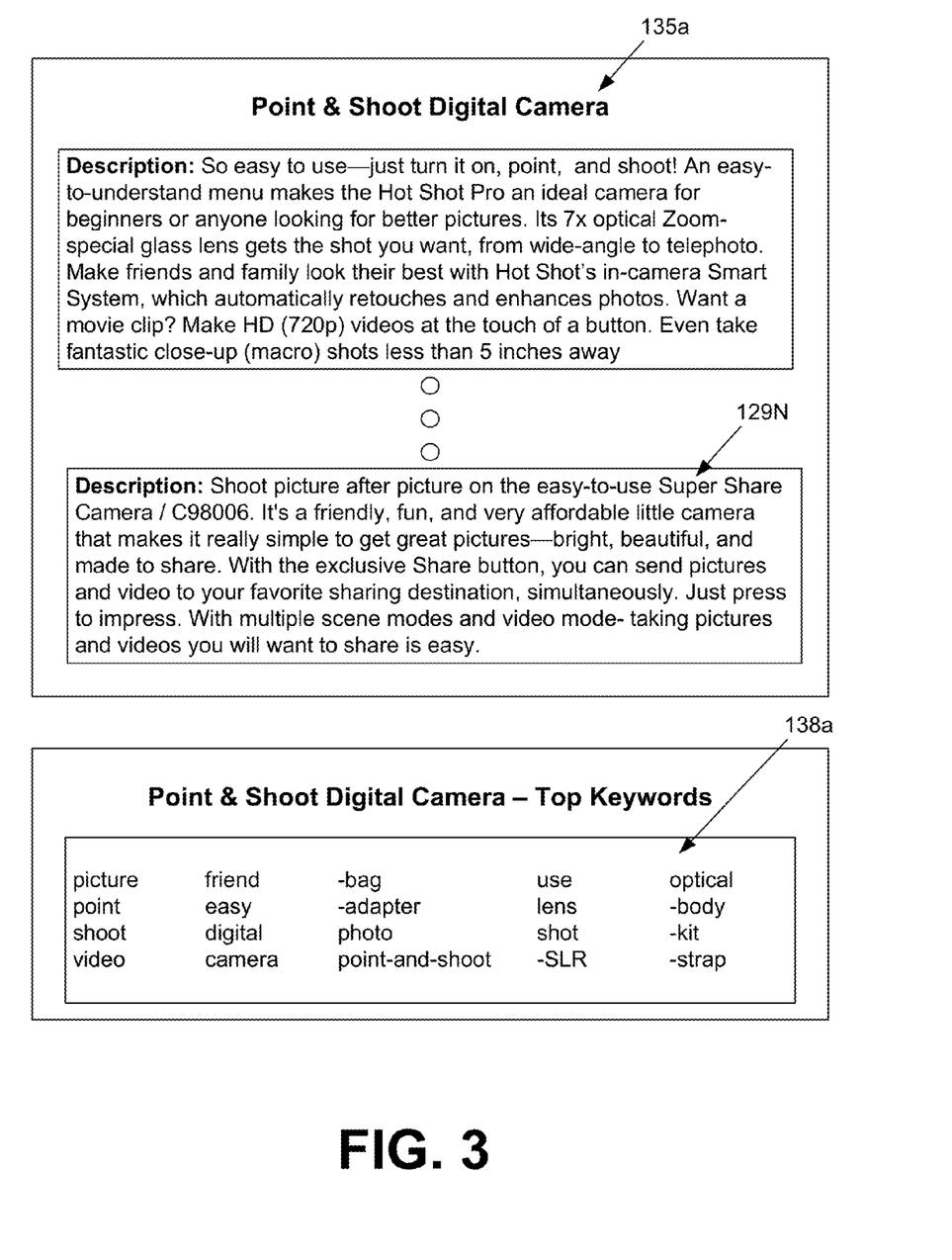

Moving on to FIG. 3, shown is an example of data stored in a data store 112 (FIG. 1) within the networked environment 100 of FIG. 1 according to various embodiments of the present disclosure. FIG. 3 represents data accessed by a categorizer 141 (FIG. 1) and data generated by the categorizer 141.

FIG. 3 depicts an exemplary target category 135. This target category 135a may be associated with a plurality of different product descriptions 129a-N. The categorizer 141 is configured to parse the product descriptions 129a-N for a given target category 135a to generate a plurality of top keywords 138a.

To begin, the categorizer 141 selects a category from a category list 130 (FIG. 1) and then designates this is a target category 135a. The objective of the categorizer 141 is to generate a set of rules 132 (FIG. 1) for the target category 135a that determine whether an unstructured text input included within a prospective seller catalog 197 (FIG. 1) expresses a seller item that falls within the target category 135a. The categorizer 141 identifies all the product descriptions 129a-N that are associated with the target category 135a by accessing a catalog 120 (FIG. 1). Specifically, the categorizer 141 is configured to identify all the product descriptions by comparing the pre-selected category 126 (FIG. 1) for each item 123 (FIG. 1) to the target category 135a.

Next, the categorizer 141 parses the product descriptions included in the catalog 120 to generate a plurality of top keywords 138a associated with the target category 135a. The categorizer 141 analyzes all the product descriptions 129a-N associated with the target category 135a to identify the most frequent keywords.

In one embodiment, the categorizer 141 employs a Term Frequency Inverse Document Frequency (TF-IDF) analysis to identify the plurality of top keywords 138a. In this case, the categorizer 141 tabulates the frequency of each term that exists in the plurality of product descriptions 129a-N associated with the target category 135a. For example, the term "picture" may occur hundreds of times when analyzing all the product descriptions for the target category of "point & shoot digital cameras." Consequently, the term "the" may also occur hundreds of times. Then, when employing TF-IDF, the categorizer 141 discounts the weight of terms that occur frequently with regard to an entire document, the entire document being all the product descriptions 129 (FIG. 1) of the entire catalog 120. Common terms like "the" will be given less weight and as a result of the TF-IDF analysis, such terms will eventually be omitted from the plurality of top keywords 138a. By employing a TF-IDF analysis a plurality of top keywords 138a is defined specifically for a target category 135a.

In another embodiment, a Term Frequency Squared Inverse Document Frequency (TFS-IDF) analysis is employed by the categorizer 141 to identify a plurality of top keywords 138a. TFS-DFS uses principals similar to TF-IDF, however, the TFS-IDF algorithm squares the weight of the frequency of the terms within the product descriptions 129a-N associated with the target category 135a. For example, if the term "point" occurred 27 times when analyzing the set of "point & shoot digital camera" product descriptions, then the corresponding weight for the target term "point" is 27*27 or 729. Thus, under the TFS-IDF analysis, an exponential amount of weight is given to a target term for each incremental increase in term frequency.

In various embodiments, when generating the top keywords 138a, the categorizer 141 is configured to identify single word terms such as "point," friend, "photo," etc. Additionally, the categorizer may also identify multi-word terms such as a bigram "digital-camera" or a trigram "point-and-shoot." Accordingly, the multi-word terms are treated like a single keyword.

In other embodiments, the categorizer 141 may identify negative keywords such as "−bag," "−kit," etc. A negative keyword represents an omission of a term in a product description. In this example, a negative keyword is denoted with a "−" preceding the term. Employing negative keywords is useful in situations where two specific categories are distinct, yet closely related within the categorical hierarchy. When determining negative keywords, the categorizer 141 may be configured to analyze the terms in the target category 135 (FIG. 1) and compare those terms to the frequency of terms in a distinct, yet closely related category. For example, the target category 135a of "point & shoot digital cameras" is distinct but closely related to the category of "point & shoot digital camera accessories." The categorizer 141 may determine that the terms "bag" and "kit" do not occur in the target category 135a, however, these terms frequently occur in the "point & shoot digital camera accessories" category. Accordingly, the categorizer 141 may generate negative keywords for the target category 135a.

Figure 4:
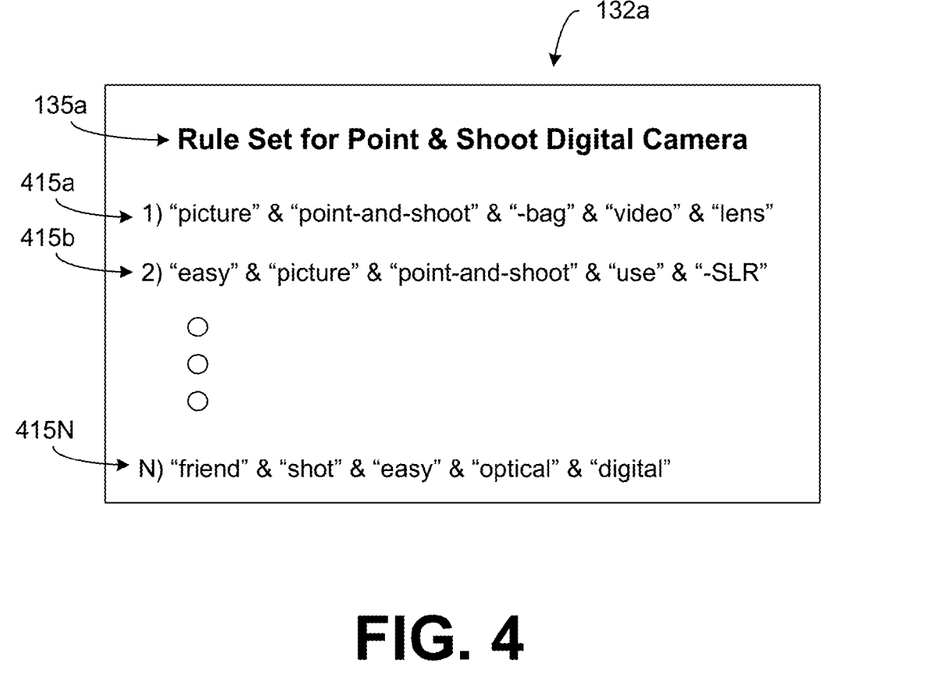

Turning now to FIG. 4, shown is an example of data stored in a data store 112 (FIG. 1) within the networked environment 100 of FIG. 1 according to various embodiments of the present disclosure. FIG. 4 represents the structure of a set of rules 132a for a particular target category 135a. The set of rules 132a comprises a plurality of individual rules 415a-N.

The categorizer 141 (FIG. 1) is configured to generate a set of rules 132a for a target category 135a based on a plurality of top keywords 138a (FIG. 3) associated with the target category 135a. In various embodiments, each rule 415a-N is comprised of a subset of the top keywords 138a. In this respect, various unique combinations of the top keywords 138a are used to generate each rule 415a-N. For example, a first rule 415a, may use the keywords "picture," "point-and-shoot," "−bag," "video," and "lens," such that the first rule 415a is generated based on a subset of the top keywords 138a.

In various embodiments, the number of terms selected for each rule 415a-N is selected according to a pre-determined number of terms. For example, as seen in FIG. 4, each rule 415a-N is five terms long. That is to say, five top keywords 138a are chosen to create each rule. Choosing a pre-determined number of terms that is too small leads to broad rules that do not generate meaningful results. And, choosing a pre-determined number of terms that is too large leads to an excessive number of calculations when applying the sets of rules to inputs.

When applying each rule 415a-N to an input of unstructured text, each rule is configured to generate a binary result. The result indicates if either all the terms are present or all the terms are absent from an input. When applying the set of rules 132a to the input, the number of rules generating a like binary result indicates whether the input expresses an item that falls within a corresponding target category 135 (FIG. 1). For example, 1000 rules 415a-N may be generated for a target category 135a. The set of 1000 rules 132a is applied to an unstructured text input to determine the number of rules that indicate a positive result. In this example, 900 rules indicate a positive result. A percentage may be calculated based on the number of positive results such as 90%. This percentage may be checked against a pre-defined threshold amount. If 90% is greater than the pre-defined threshold amount, then it is deemed that the unstructured text input expresses an item that falls within the target category 135a. If 90% is less than the pre-defined threshold amount, then it is deemed that the unstructured text input expresses an item that does not fall within the target category 135a.

As seen in FIG. 4, a set of rules 132a is generated for a target category 135a. The categorizer 141 can be configured to generate a set of rules 132a for each category within a list of categories 130 (FIG. 1). Accordingly, the plurality of the sets of rules 132 (FIG. 1) may determine an input product description falls within a category included within the category list 130. In one embodiment, sets of rules 132 are defined only for the most specific category within a categorical hierarchy.

Furthermore, as at least one benefit of the present disclosure, the syntax and structure of the rules are easy to read and validate by human product developers. In this respect, each rule is a simple equation made up of words that are readable by humans. Furthermore, the threshold settings can easily be adjusted to achieve desired results.

Figure 5:
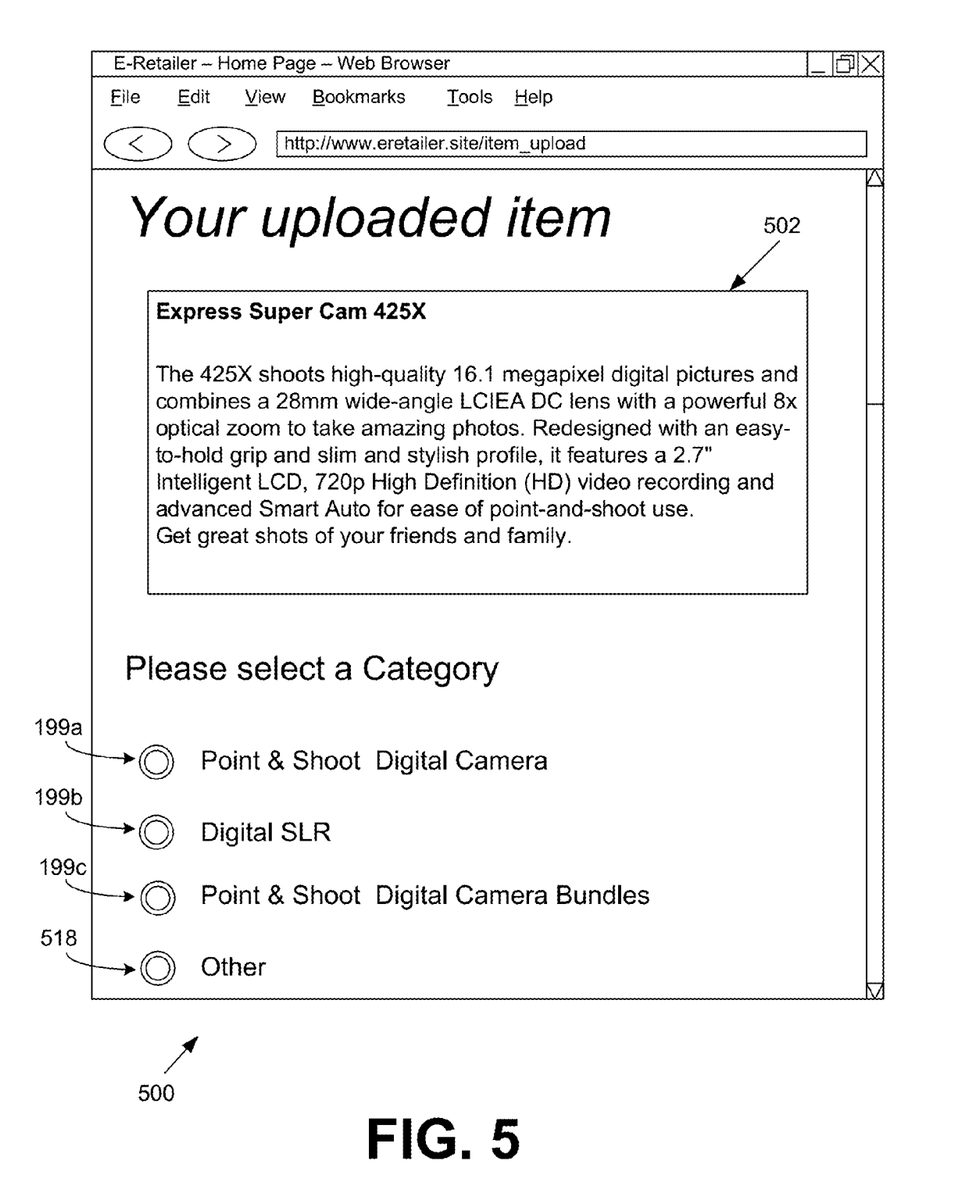
FIG. 5 is a drawing of an example of a user interface rendered by a client in the networked environment of FIG. 1 according to various embodiments of the present disclosure.

Referring next to FIG. 5, shown is a drawing of an example of a user interface 500 rendered by a client 106 (FIG. 1) in the networked environment 100 of FIG. 1 according to various embodiments of the present disclosure. The user interface 500 may include a preview 502 that presents a prospective seller product description. Additionally, the user interface 500 may include one or more recommendations 199a-c of categories to assist a seller in determining an accurate product category. Additionally, the user interface may include an "other" option 518 to manually select a category that has not been recommended.

The various embodiments, the user interface 500 may be encoded and transmitted to a seller using a client 106 in response to a seller catalog 197 (FIG. 1) submission. In this respect, a seller uploads a prospective catalog of items 197 to the computing device 103 (FIG. 1) in using the services offered by the electronic commerce system 118 (FIG. 1). The seller catalog 197 may include a prospective seller product description that expresses an item that the seller wishes to sell over the electronic marketplace. This prospective seller product description may be presented to the seller in a preview 502.

When the prospective seller product description is received by the computing device 103, the categorizer 141 (FIG. 1) may be employed to generate one or more recommendations 199a-c for appropriate categories. The categorizer 141 may apply a plurality of sets of rules 132 (FIG. 1), each set configured to determine whether an item expressed in the product description falls within a respective category.

In the example of FIG. 5, the set of rules 132a (FIG. 4) that corresponds to the "point & shoot digital camera" category may be applied to the prospective seller product description presented in the preview 502. Assuming that the first rule 415a (FIG. 4) is applied, the first rule will indicate a positive binary result because all of the terms "picture," "point-and-shoot," "–bag," "video," and "lens" exist within the prospective seller product description presented in the preview 502. If the number of positive binary results for a given set of rules 132 exceeds a threshold amount, then the categorizer 141 recommends the target category 135 (FIG. 1) associated with the set of rules 132.

As seen in FIG. 5, the categorizer 141 has identified and recommended three categories for the prospective seller product description presented in the preview 502. The user interface 500 additionally includes an "other" option 518 that allows the seller to indicate that he or she has rejected the recommendations 199a-c. If the seller has rejected the recommendations, then, in response, the categorizer 141 may flag each of the sets of rules corresponding to the recommendations 199a-c for review. That is to say, the fact that a seller has not chosen a particular recommendation may imply that the set of rules 132 used to generate the recommendation may be defective.

In one embodiment, the categorizer 141 can be executed to automatically categorize uploaded seller catalog 197 (FIG. 1). That is to say, in this embodiment, a seller need not confirm a recommended category 199 (FIG. 1). Rather, the most closely matching category will automatically be applied to each seller product description within the uploaded seller catalog 197.

Figure 6:
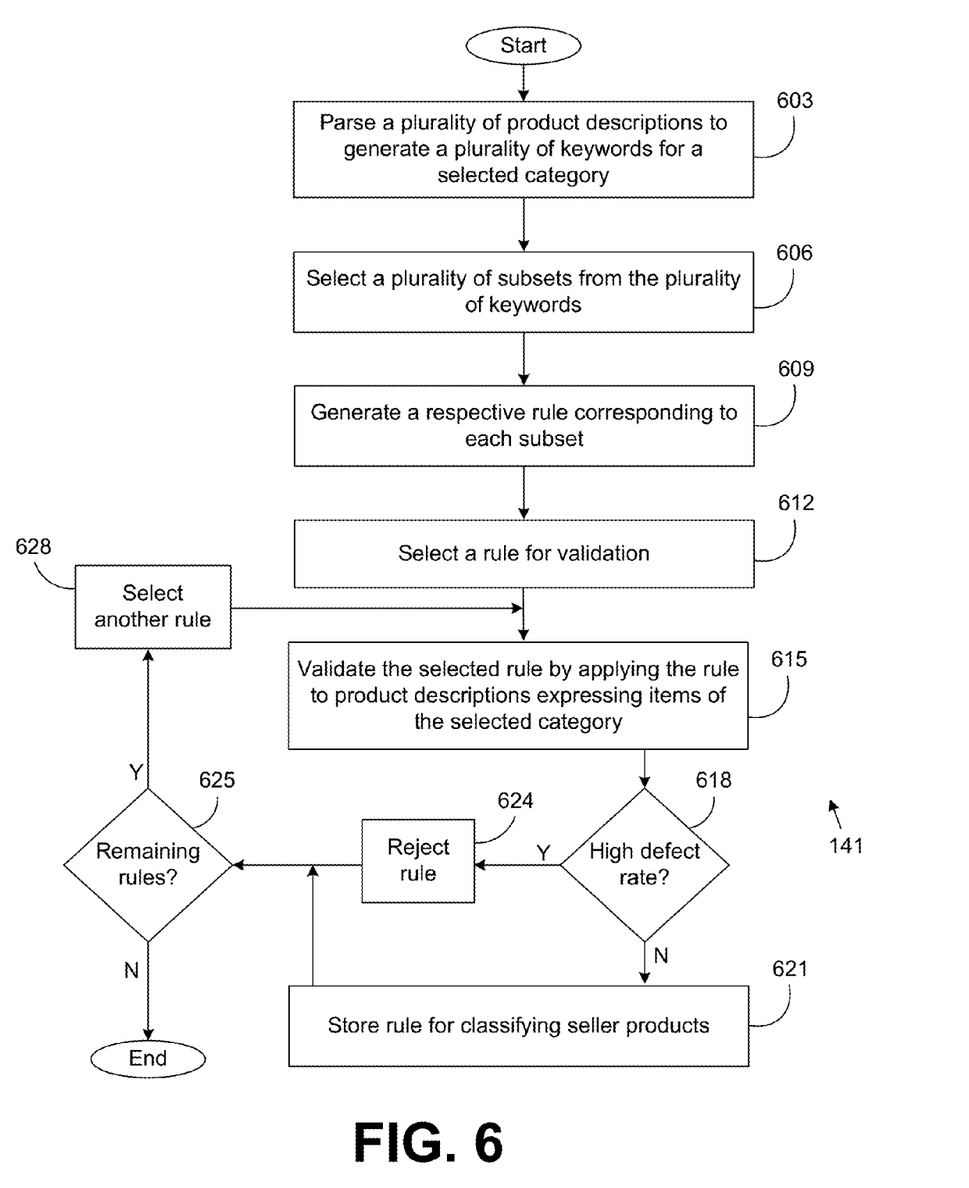
FIGS. 6 & 7 are flowcharts illustrating examples of functionality implemented as portions of a categorizer executed in a computing device in the networked environment of FIG. 1 according to various embodiments of the present disclosure.

Referring next to FIG. 6, shown is a flowchart that provides one example of the operation of a portion of the categorizer 141 according to various embodiments. Specifically, FIG. 6 represents the generation of a set of rules 132 (FIG. 1) for a target category 135 (FIG. 1). It is understood that the flowchart of FIG. 6 provides merely an example of the many different types of functional arrangements that may be employed to implement the operation of the portion of the categorizer 141 as described herein. As an alternative, the flowchart of FIG. 6 may be viewed as depicting an example of steps of a method implemented in the computing device 103 (FIG. 1) according to one or more embodiments.

Beginning with box 603, the categorizer 141 parses a plurality of product descriptions 129 (FIG. 1) to generate a plurality of keywords 138 (FIG. 1) for a selected category. The selected category may be selected from a list of categories 130 (FIG. 1) and designated as a target category for purposes relating to the generation of a corresponding set of rules 132. In box 606, the categorizer 141 selects a plurality of subsets from the plurality of keywords 138. Each subset may be a unique combination of terms chosen from the plurality of keywords 138. Furthermore, each subset may be selected according to a predefined size in terms of the number of keywords.

Next, in box 609, the categorizer 141 generates respective rules, each rule corresponding to each subset. The rule may be a simple search string that yields a binary result. Thus, a set of rules 132 is generated for the selected target category. In box 612, the categorizer 141 selects one of the rules from the set of rules for validation.

In box 615, the selected rule is validated by applying the selected rule to various product descriptions 129 within the catalog 120 (FIG. 1). A defect rate may be calculated based on the number and/or percentage of product descriptions that were correctly classified by the selected rule. For example, assume that, for a target category of "point & shoot digital camera" a selected rule is defined as the following:

"picture" & "point-and-shoot" & "-bag" & "video" & "lens"

In a first case, a product description of an item that is not in the category of "point & shoot digital camera" may include all the terms "picture," "point-and-shoot," "-bag," "video," and "lens." In this first case, the defect rate of the exemplary rule above may increase. That is to say, the exemplary rule above identified an item that is not a "point & shoot digital camera" as an item that is a "point & shoot digital camera." Similarly, in a second case, a product description of an item that is in the category of "point & shoot digital camera" may not include all the terms of "picture," "point-and-shoot," "-bag," "video," and "lens." In this second case, the defect rate of the exemplary rule above may again increase. In this respect, the exemplary rule above identified an item that is a "point & shoot digital camera" as an item that is not a "point & shoot digital camera."

However, in a third case, the defect rate of the exemplary rule may not increase when a product description of an item that is in the category of "point & shoot digital camera" includes all the terms of "picture," "point-and-shoot," "-bag," "video," and "lens." And similarly, in a fourth case, the defect rate of the exemplary rule may not increase when a product description of an item that is not in the category of "point & shoot digital camera" does not include all the terms of "picture," "point-and-shoot," "-bag," "video," and "lens."

Accordingly, a selected rule may be applied to the product descriptions 129 of the catalog 120. Based on the four cases discussed above, a defect rate for the selected rule may be calculated. To this end, the number of false positive results and/or false negative results contribute the defect rate for a selected ruled by applying the rule to a variety of product descriptions 129 corresponding to known, pre-selected categories 126 (FIG. 1).

In various embodiments, defect rate thresholds may be set to define what constitutes a high and/or low defect rate. Moreover, rules with low defect rates may be given a high weight. In this respect, rules may be weighted according to their tested accuracy.

If the defect rate exceeds a threshold amount, in box 618, then the selected rule is rejected or otherwise removed from consideration, as seen in box 624. If, however, the defect rate is low, thus falling below a threshold amount, then the rule is validated and stored for classifying seller products, as seen in box 621. In some embodiments, the selected rule is stored along with its corresponding defect rate. This defect rate may be used to weight the rule if the rule is subsequently applied for classifying a seller product description.

In box 625, the categorizer 141 checks to see if there are remaining rules from the set of rules 415a-N that have yet to be validated. If all rules have been validated, then the routine terminates. Otherwise, as seen in box 628, another rule is selected for validation.

Figure 7:
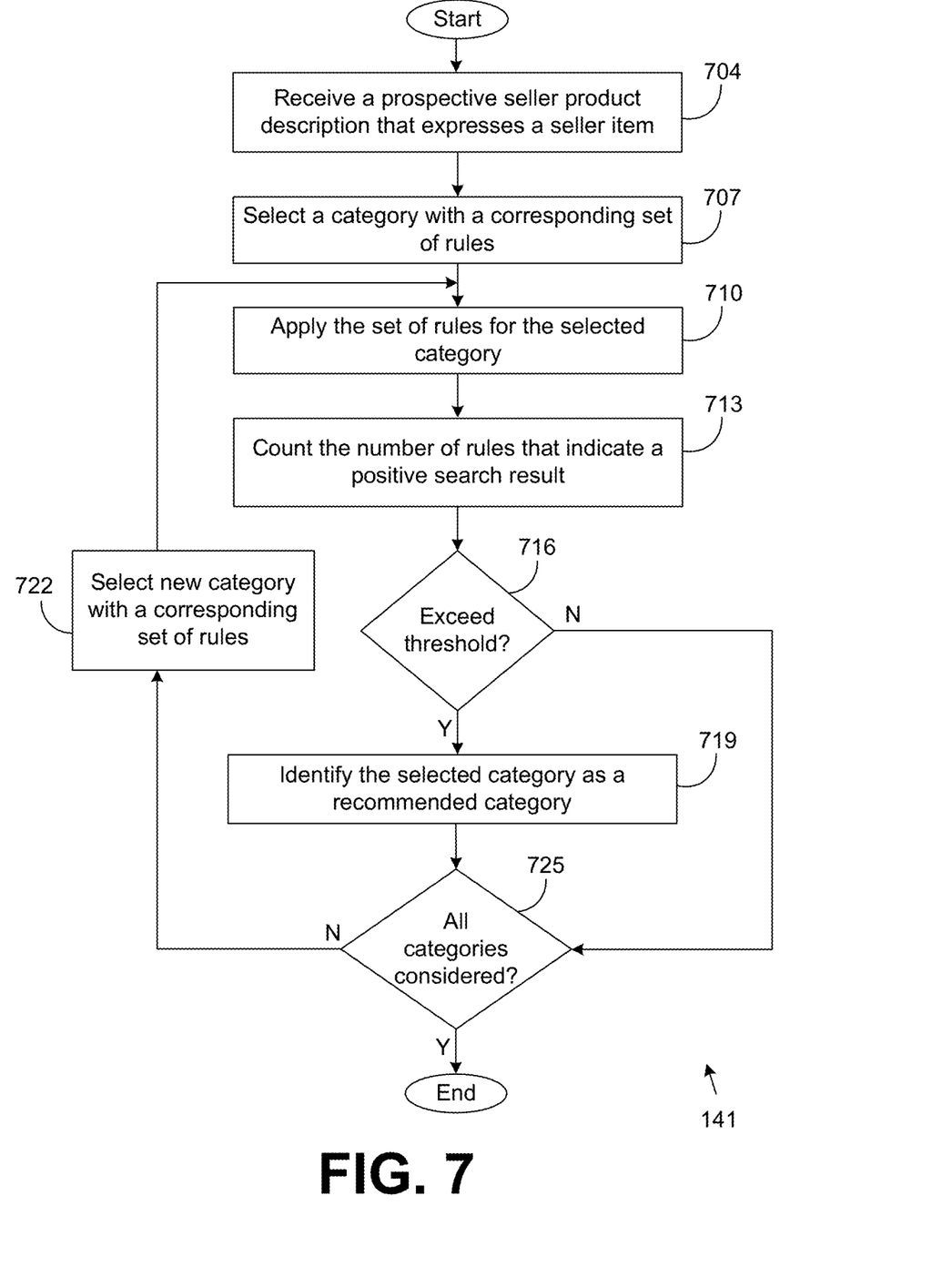

Referring next to FIG. 7, shown is a flowchart that provides one example of the operation of a portion of the categorizer 141 according to various embodiments. Specifically, FIG. 7 represents the application of a plurality of sets of rules 132 (FIG. 1) for a target category 135 (FIG. 1). It is understood that the flowchart of FIG. 7 provides merely an example of the many different types of functional arrangements that may be employed to implement the operation of the portion of the categorizer 141 as described herein. As an alternative, the flowchart of FIG. 7 may be viewed as depicting an example of steps of a method implemented in the computing device 103 (FIG. 1) according to one or more embodiments.

To begin, in box 704, the categorizer 141 receives a prospective seller product description that expresses a seller item. In box 707, the categorizer 141 selects a category with a corresponding set of rules 132. In box 710, the categorizer 141 applies the set of rules 132 for the selected category. When applying one rule, the categorizer executes a search query on an unstructured text input where the terms of the rule are the terms of the search query. To this end, if a rule has five unique terms, the categorizer 141 checks to see if each and every one of those five terms is present within the unstructured text input. The result is either positive or negative. Thus, an application of a rule is a basic text operation that produces a binary result. When applying a set of rules 132, the number of binary results equals the number of rules within the set of rules 132.

Next, in box 713, the categorizer 141 counts the number rules that indicate a positive search result. That is to say, the set of rules 132 may comprise thousands of simple rules. Each rule specifies a positive or a negative result. In various embodiments, some rules may be weighted higher than others based on the defect rate of a rule. To this end, a rule that has a very low defect rate, based on a predetermined threshold amount, then that rule may be given heavy weight.

If the number of positive results for the set of rules 132 exceeds a threshold amount, as seen in box 716, then the categorizer branches to box 719. In similar respects, the percentage of positive results with regard to all the results of a set of rules 132 may be checked against a threshold percent.

At box 719, the categorizer 141 identifies the selected category as a recommended category 199 (FIG. 1). If however, the threshold amount is not met, then the categorizer 141 branches to box 725. In this respect, the categorizer 141, by applying the set of rules 132, determines that the prospective seller product description does not fall within the selected category. It is expected that this is a more frequent outcome.

In box 725, the categorizer 141 checks to see if the set of rules 132 for each category has been applied to the prospective seller product description. If so, the categorizer completes 141 its operation. However, if outstanding categories remain, the categorizer 141 selects a new category with a corresponding set of rules 132 to be applied to the prospective seller product description. This ensures that all rules are applied for categorizing the item expressed within prospective seller product description.

Figure 8:
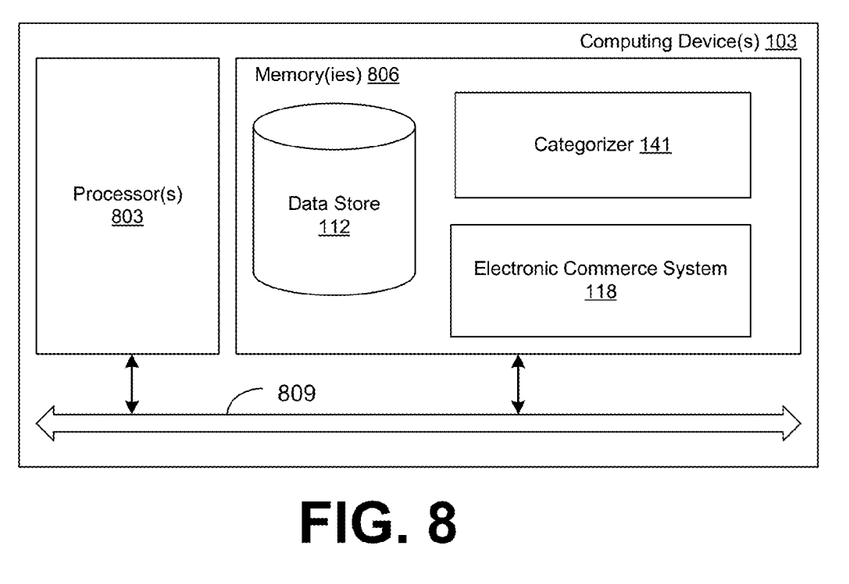
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the categorizer 141, electronic commerce system 118, and potentially other applications. Also stored in the memory 806 may be a data store 112 and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the categorizer 141, the electronic commerce system 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6 and 7 show the functionality and operation of an implementation of portions of the categorizer 141. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the categorizer 141 and/or the electronic commerce system 118, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising a set of instructions that, when executed by a processor of the computing device, cause the computing device to at least:
   facilitate access to a catalog of items, the catalog of items comprising an amount of unstructured text for describing each item, wherein each item corresponds to at least one category;
   identify a plurality of keywords expressed within the amount of unstructured text with respect to a selected category;
   select a plurality of subsets from the plurality of keywords, wherein each of the subsets comprises a unique combination of the plurality of keywords with respect to each other and wherein each of the subsets includes a predetermined number of search terms;
   generate a respective rule for each corresponding subset, wherein an application of each respective rule specifies a respective binary result depending upon whether the corresponding subset is included in a prospective seller product description;
   apply each respective rule to the prospective seller product description to determine whether a predefined number of the rules indicate a like binary result for indicating whether the prospective seller product description expresses an item within the selected category;
   calculate a defect rate corresponding to each respective rule, the defect rate representing a percentage of a plurality of product descriptions correctly classified with each respective rule; and
   update each respective rule based at least in part on the corresponding defect rate.

2. The computer-readable medium of claim 1, wherein at least one of the plurality of keywords comprises at least one of a negative keyword, a bi-gram, or a tri-gram.

3. The computer-readable medium of claim 1, wherein the program further comprises instructions that cause the computing device to at least apply each respective rule to at least the amount of unstructured text to determine an accuracy of a set of rules comprising each of the respective rules.

4. The computer-readable medium of claim 1, wherein causing the computing device to identify the plurality of keywords further comprises causing the computing device to use a term frequency inverse document frequency analysis.

5. A system, comprising:
   at least one computing device comprising a processor and a memory; and
   an application stored in the memory and comprising instructions executable by the processor of the at least one computing device, wherein the application, when executed, causes the at least one computing device to at least:
      access a catalog that organizes a plurality of items into a categorical hierarchy, wherein each item is expressed in terms of a product description;
      parse at least a portion of the product descriptions associated with a selected category to generate a plurality of keywords for the selected category;
      select a subset of the plurality of keywords;
      generate at least one rule based on the subset, wherein an application of the at least one rule specifies a respective binary result depending upon whether the subset of the plurality of keywords is included in a prospective seller product description;
      apply the at least one rule to the prospective seller product description to determine that the prospective seller product description expresses an item within the selected category;
      calculate a percentage of a plurality of product descriptions correctly categorized with the at least one rule; and
      update the at least one rule based at least in part on the calculated percentage.

6. The system of claim 5, wherein causing the at least one computing device to select the subset of the plurality of keywords further comprises causing the at least one computing device to select a predetermined number of search terms.

7. The system of claim 6, wherein causing the at least one computing device to generate the at least one rule further comprises causing the at least one computing device to generate a plurality of rules, wherein each of the plurality of rules comprises a respective subset of the plurality of keywords, each respective subset of the plurality of keywords comprises a unique combination of the plurality of keywords with respect to each other, wherein each respective subset includes the predetermined number of search terms.

8. The system of claim 7, wherein the application further causes the at least one computing device to apply the plurality of rules to the prospective seller product description for determining a number of rules that indicate a like binary result, wherein application of the at least one rule to the prospective seller product description comprises a determination that the prospective seller product description expresses an item within the selected category when the number of rules that indicate the like binary result exceeds a threshold amount.

9. The system of claim 5, wherein causing the at least one computing device to parse at least the portion of the product descriptions associated with the selected category to generate the plurality of keywords relating to the selected category further causes the at least one computing device to use a term frequency inverse document frequency analysis to parse the portion of the product descriptions associated with the selected category.

10. The system of claim 5, wherein causing the at least one computing device to parse at least the portion of the product descriptions associated with the selected category to generate the plurality of keywords relating to the selected category further causes the at least one computing device to use a term frequency squared inverse document frequency analysis to parse the portion of the product descriptions associated with the selected category, wherein the term frequency squared inverse document frequency analysis comprises squaring a frequency score of a target term.

11. The system of claim 5, wherein at least one of the plurality of keywords comprises at least one of a negative keyword, a bi-gram, or a tri-gram.

12. The system of claim 5, wherein at least one rule comprises a weight representing the calculated percentage of a plurality of product descriptions correctly categorized with the at least one rule.

13. The system of claim 12, wherein a value of the weight is inversely proportional to the calculated percentage of the plurality of product descriptions correctly categorized with the at least one rule.

14. A method, comprising:
   parsing, in at least one computing device, at least a plurality of product descriptions of a like item category for identifying a plurality of keywords associated with the like item category;
   selecting, in the at least one computing device, a plurality of subsets of keywords from the plurality of keywords, wherein each of the subsets of keywords comprises a unique combination of the plurality of keywords with respect to each other;

generating, in the at least one computing device, a respective rule for each corresponding subset of keywords, wherein an application of each respective rule specifies a respective binary result depending upon whether the corresponding subset of keywords is included in a seller product description;

calculating, in the at least one computing device, a percentage of the plurality of product descriptions correctly classified by the respective rule to generate a defect rate for the respective rule; and updating, in the at least one computing device, the respective rule based at least in part on the defect rate.

15. The method of claim 14, further comprising encoding, in the at least one computing device, a user interface for display at a client, wherein the user interface is configured to facilitate receiving a prospective seller catalog, wherein the prospective seller catalog comprises at least one prospective seller product description that expresses at least one seller item.

16. The method of claim 15, further comprising:
identifying, in the at least one computing device, at least one recommended category for the at least one item based on applying at least one generated rule to the at least one prospective seller product description; and
presenting the at least one recommended category in the user interface.

17. The method of claim 14, further:
receiving, in the at least one computing device, a prospective seller product description that expresses an item for sale by the prospective seller;
identifying, in the at least one computing device, a recommended category for the item based on applying at least one generated rule to the prospective seller product description; and
automatically designating, in the at least one computing device, a category for the item.

18. The method of claim 16, wherein the user interface is configured to receive an input from the client indicating whether a seller using the client has rejected the at least one recommended category, wherein the method further comprises flagging the at least one generated rule for review in response to the input from the client.

19. The method of claim 14, further comprising determining, in the at least one computing device, whether a prospective seller product description that expresses a seller item falls within the like item category by applying the respective rule to the prospective seller product description and counting a number of rules that generate a like binary result.

20. The method of claim 14, wherein parsing at least the plurality of product descriptions of the like item category for identifying the plurality of keywords with regard to the like item category further comprises using at least one of term frequency inverse document frequency or term frequency squared inverse document frequency.

21. The method of claim 14, wherein each subset of keywords is selected according to a predetermined number of search terms.

22. The method of claim 14, further comprising applying, in the at least one computing device, the respective rule to a prospective seller product description to determine a recommended category for an item expressed by the prospective seller product description.

23. The method of claim 22, wherein applying the respective rule further comprises applying, in the at least one computing device, the respective rule according to a respective weight, each respective weight being determined based on the corresponding defect rate.

* * * * *